(12) United States Patent
Vijayasankar et al.

(10) Patent No.: US 8,830,980 B2
(45) Date of Patent: *Sep. 9, 2014

(54) SUPERFRAME COORDINATION IN BEACON-ENABLED NETWORKS

(75) Inventors: Kumaran Vijayasankar, Dallas, TX (US); Ramanuja Vedantham, Allen, TX (US); Badri N. Varadarajan, Mountain View, CA (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/457,638

(22) Filed: Apr. 27, 2012

(65) Prior Publication Data

US 2012/0281717 A1   Nov. 8, 2012

Related U.S. Application Data

(60) Provisional application No. 61/482,848, filed on May 5, 2011.

(51) Int. Cl.
*H04W 74/04* (2009.01)
*H04B 3/54* (2006.01)
*H04L 12/64* (2006.01)
*H04L 25/02* (2006.01)
*H04L 5/00* (2006.01)

(52) U.S. Cl.
CPC .......... *H04B 3/544* (2013.01); *H04L 25/0272* (2013.01); *H04B 2203/5483* (2013.01); *H04B 2203/5408* (2013.01); *H04L 12/6418* (2013.01); *H04B 2203/5491* (2013.01); *H04L 5/0094* (2013.01); *H04L 5/0044* (2013.01); *H04B 3/542* (2013.01); *H04B 2203/5466* (2013.01)

USPC ............ 370/348; 370/336; 370/442; 370/252

(58) Field of Classification Search
CPC ...... H04L 69/18; H04W 12/08; H04W 60/00; H04W 80/02; H04W 74/02; H04W 72/0446; H04W 88/06; H04W 72/04; H04W 72/085; H04B 3/542; H04B 2203/5408; H04B 2203/5466
USPC .......... 370/478, 446–449, 338, 330, 350, 442
See application file for complete search history.

(56) References Cited

U.S. PATENT DOCUMENTS 8,374,140 B2 * 2/2013 Hu ................................ 370/329
8,559,464 B2 * 10/2013 Caracas et al. ................ 370/503

(Continued)

*Primary Examiner* — Robert Wilson
*Assistant Examiner* — Sai Aung
(74) *Attorney, Agent, or Firm* — Steven A. Shaw; Frederick J. Telecky, Jr.

(57) ABSTRACT

Systems and methods for designing, using, and/or implementing superframe coordination in beacon-enabled networks are described. In various implementations, these systems and methods may be applicable to Power Line Communications (PLC). For example, a method may include implementing a Media Access Control (MAC) superframe using a communication device. The MAC superframe may include a plurality of beacon slots, a plurality of Contention Access Period (CAP) slots following the plurality of beacon slots, a Contention Free Period (CFP) poll access slot following the plurality of CAP slots, a CFP slot following the CFP poll access slot, an inactivity period following the CFP slot, a beacon region following the inactivity period, and a communication slot following the beacon region. The method may also include communicating with another communication device using the MAC superframe.

15 Claims, 8 Drawing Sheets

(56) References Cited

U.S. PATENT DOCUMENTS

| | | |
|---|---|---|
| 2003/0169155 A1* | 9/2003 | Mollenkopf et al. .... 340/310.01 |
| 2007/0230497 A1* | 10/2007 | Choi et al. .................... 370/442 |
| 2008/0075109 A1* | 3/2008 | Zangi ........................... 370/458 |
| 2008/0232345 A1* | 9/2008 | Espina et al. ................ 370/350 |
| 2009/0067389 A1* | 3/2009 | Lee et al. ...................... 370/336 |
| 2009/0161622 A1* | 6/2009 | Sugaya ......................... 370/329 |
| 2010/0278062 A1* | 11/2010 | Abraham et al. ............. 370/252 |
| 2010/0284312 A1* | 11/2010 | Sampath et al. .............. 370/276 |
| 2011/0038343 A1* | 2/2011 | Bhatti et al. .................. 370/330 |
| 2011/0090880 A1* | 4/2011 | Abraham et al. ............. 370/338 |

* cited by examiner

FIG. 11B

SUPERFRAME COORDINATION IN BEACON-ENABLED NETWORKS

CROSS-REFERENCE TO RELATED APPLICATION

This application claims the benefit of the filing date of U.S. Provisional Patent Application No. 61/482,848 titled "MV-MV Coordination in Multi Tone-Mask MV-LV PLC Networks" and filed May 5, 2011, the disclosure of which is hereby incorporated by reference herein in its entirety.

TECHNICAL FIELD

This specification is directed, in general, to network communications, and, more specifically, to systems and methods for designing, using, and/or implementing superframe coordination in beacon-enabled networks.

BACKGROUND

There are several different types of network communications available today. For example, power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another PLC standardization effort includes, for example, the Powerline-Related Intelligent Metering Evolution (PRIME) standard designed for OFDM-based (Orthogonal Frequency-Division Multiplexing) communications.

SUMMARY

Systems and methods for designing, using, and/or implementing superframe coordination in beacon-enabled networks are described. In an illustrative, non-limiting embodiment, a method may include implementing a Media Access Control (MAC) superframe using a communication device. For example, the MAC superframe may include a plurality of beacon slots, a plurality of Contention Access Period (CAP) slots following the plurality of beacon slots, a Contention Free Period (CFP) poll access slot following the plurality of CAP slots, a CFP slot following the CFP poll access slot, an inactivity period following the CFP slot, a beacon region following the inactivity period, and a communication slot following the beacon region. The method may also include communicating with another communication device using the MAC superframe.

In some implementations, each of the plurality of beacon slots may occur over a respective subband of a sequence of frequency subbands, and each of the plurality of CAP slots may occur over a respective subband of the sequence of frequency subbands. Moreover, the sequence of frequency subbands may be randomly selected. The communication device may be configured to compete with the other communication device, during at least a portion of the CFP poll access slot, for use the CFP slot. Additionally or alternatively, the communication device may be configured to compete with the other communication device, during at least a portion of the beacon region, for use of a plurality of beacon slots and a plurality of CAP slots in a subsequent MAC superframe.

In some embodiments, the communication device may be a power line communications (PLC) data concentrator coupled to a medium-voltage (MV) power line. The PLC data concentrator is configured to communicate with a PLC device during at least a portion of at least one of the plurality of beacon slots and during at least a portion of at least one of the plurality of CAP slots, the PLC device coupled to a low-voltage (LV) power line, the LV power line coupled to the MV power line through a transformer. Additionally or alternatively, the PLC data concentrator may be configured to not transmit messages during at least a portion of the inactivity period to allow communications between the PLC device and another PLC device, the other PLC device coupled to the LV power line.

In some cases, the other communication device may be another PLC data concentrator coupled to the MV power line, and the communication between the PLC data concentrator and the other PLC data concentrator may configured to place during at least a portion of the communication slot. Moreover, the PLC data concentrator may be configured to not communicate with the PLC devices during at least a portion of the communication slot, and the PLC devices may be configured to communicate with each other during at least a portion of the communication slot.

In another illustrative, non-limiting embodiment, a system may include a PLC data concentrator coupled to an MV power line, the MV power line coupled to an LV power line through a transformer. The PLC data concentrator may also include a processor and a memory coupled to the processor, the memory configured to store program instructions executable by the processor to cause the PLC data concentrator to implement a MAC superframe. The MAC superframe may include a plurality of beacon slots, a plurality of CAP slots following the plurality of beacon slots, and a CFP slot following the plurality of CAP slots. The program instructions may be further executable by the processor to cause the PLC data concentrator to communicate with another PLC data concentrator using the MAC superframe.

In some implementations, the other PLC data concentrator may be configured to implement another MAC superframe. For example, the plurality of beacon and CAP slots of the MAC superframe may follow a different sequence of frequency subbands than a plurality of beacon and CAP slots of the other MAC superframe. The plurality of CAP slots of the MAC superframe may have a synchronized start time and a synchronized end time with respect to the plurality of CAP slots of the other MAC superframe. Additionally or alternatively, the plurality of CAP slots of the MAC superframe may have a synchronized start time and a synchronized end time with respect to a corresponding one of the plurality of CAP slots of the other MAC superframe. Moreover, the CFP slot of the MAC superframe may include a downlink slot and an uplink slot, and the downlink and uplink slots may be synchronized with respect to downlink and uplink slots within a CFP slot of the other MAC superframe.

In yet another illustrative, non-limiting embodiment a tangible or non-transitory electronic storage medium may have program instructions stored thereon that, upon execution by a processor within a PLC device, cause the PLC device to store a first MAC superframe. The first MAC superframe may include a plurality of beacon slots, a plurality of CAP slots following the plurality of beacon slots, a CFP poll access slot following the plurality of CAP slots, a CFP slot following the CFP poll access slot, and a first communication slot following the CFP slot, the first communication slot configured to allow communications between PLC devices coupled to an MV power line. The program instructions may also cause the PLC device to store a second MAC superframe. The second MAC superframe may have a second set of beacon slots and a second communication slot following the second set of beacon slots, the second communication slot configured to allow communications between PLC devices coupled to a low-voltage (LV) power line, and a duration of the second communication slot corresponding to a sum of durations of the plurality of CAP slots, the CFP poll access slot, the CFP slot and the first communication slot. The program instructions may further cause the PLC device to implement a sequence of MAC superframes, the sequence of MAC superframes including the first MAC superframe followed by one or more of the second MAC superframes.

In some implementations, the sequence of MAC superframes may be defined by a Personal Area Network (PAN) coordinator, and a number of the one or more of the second MAC superframes corresponds to a number of other PLC devices neighboring the PLC device. Further, the first MAC superframe may include a guard region following the communication slot, the second MAC superframe may include a guard region following the second inactivity period, and the program instructions may further cause the PLC device to contend with another PLC device, during at least a portion of the guard regions, for implementation of a subsequent first MAC superframe.

In some embodiments, one or more communication devices or computer systems may perform one or more of the techniques described herein. In other embodiments, a tangible computer-readable or electronic storage medium may have program instructions stored thereon that, upon execution by one or more communication devices or computer systems, cause the one or more communication devices or computer systems to execute one or more operations disclosed herein. In yet other embodiments, a communication system (e.g., a device or modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Having thus described the invention(s) in general terms, reference will now be made to the accompanying drawings, wherein:

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, the systems and methods described herein may be used to design and/or implement superframe coordination in beacon-enabled networks. Generally speaking, these systems and methods may be applicable to a wide variety of communication environments, including, but not limited to, those involving wireless communications (e.g., cellular, Wi-Fi, WiMax, etc.), wired communications (e.g., Ethernet, etc.), power line communications (PLC), or the like. For ease of explanation, several examples discussed below are described specifically in the context of PLC. As a person of ordinary skill in the art will recognize in light of this disclosure, however, certain techniques and principles disclosed herein may also be applicable to other communication environments.

Figure 1:
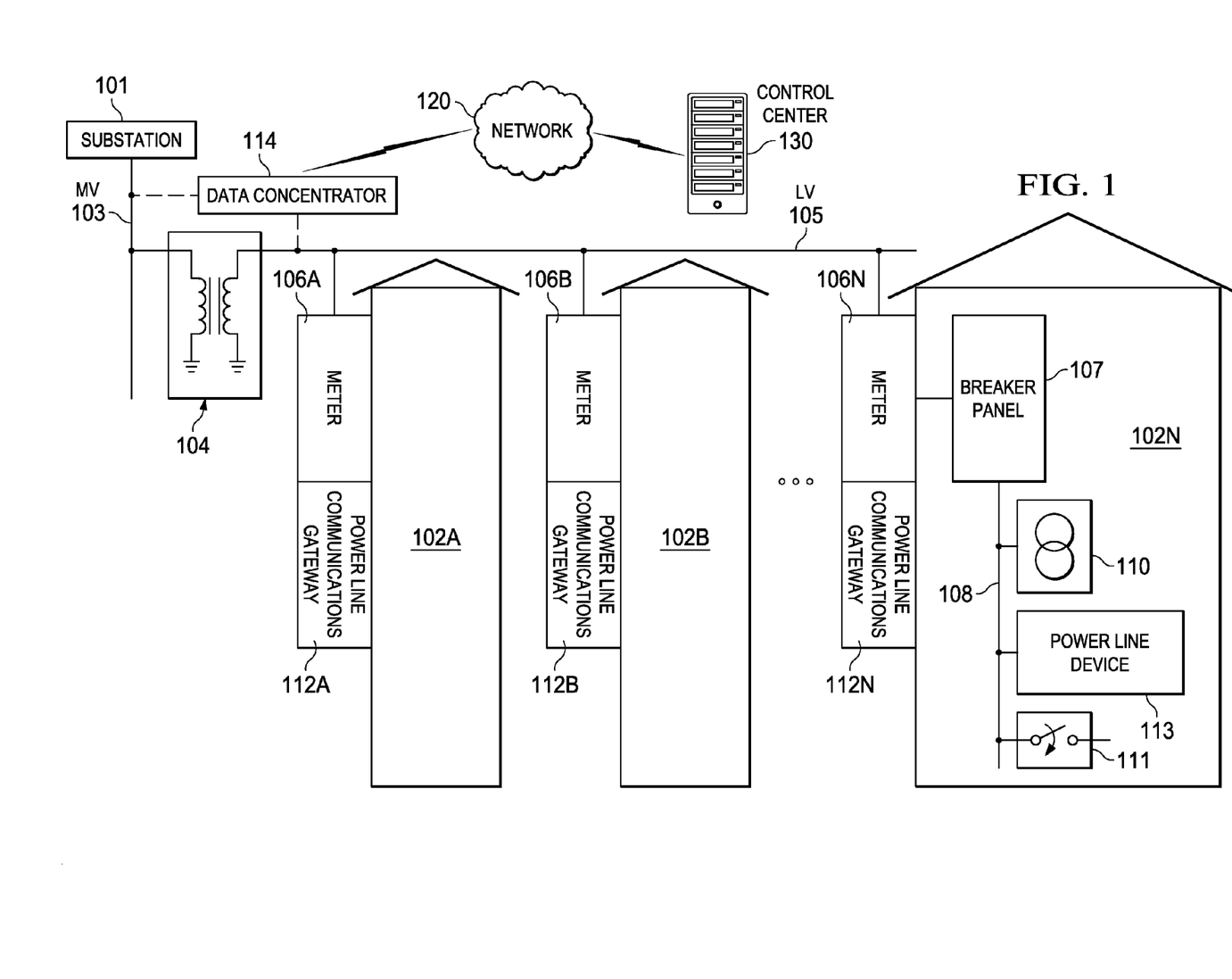
FIG. 1 is a block diagram of a power line communication (PLC) environment according to some embodiments.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

Figure 2:
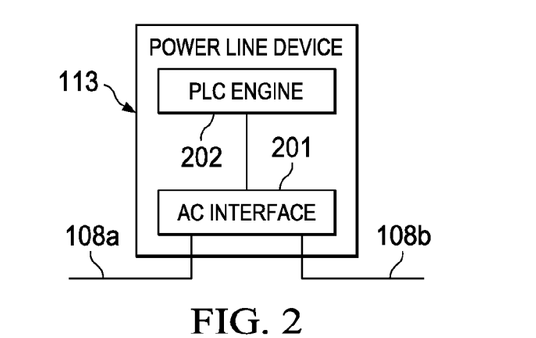
FIG. 2 is a block diagram of a PLC device or modem according to some embodiments.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

Figure 3:
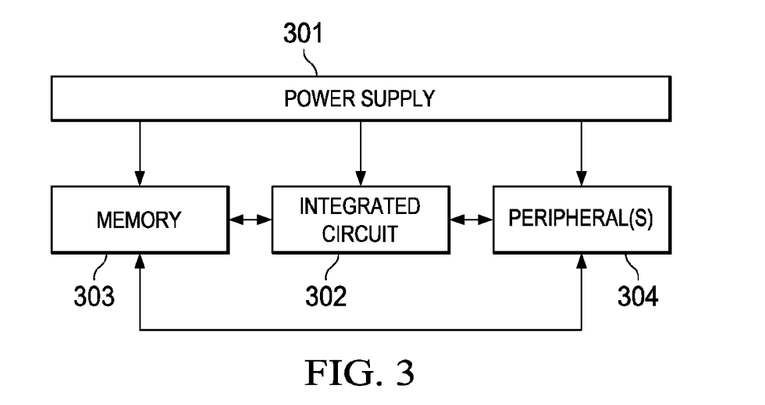
FIG. 3 is a block diagram of an integrated circuit according to some embodiments.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

Figure 4:
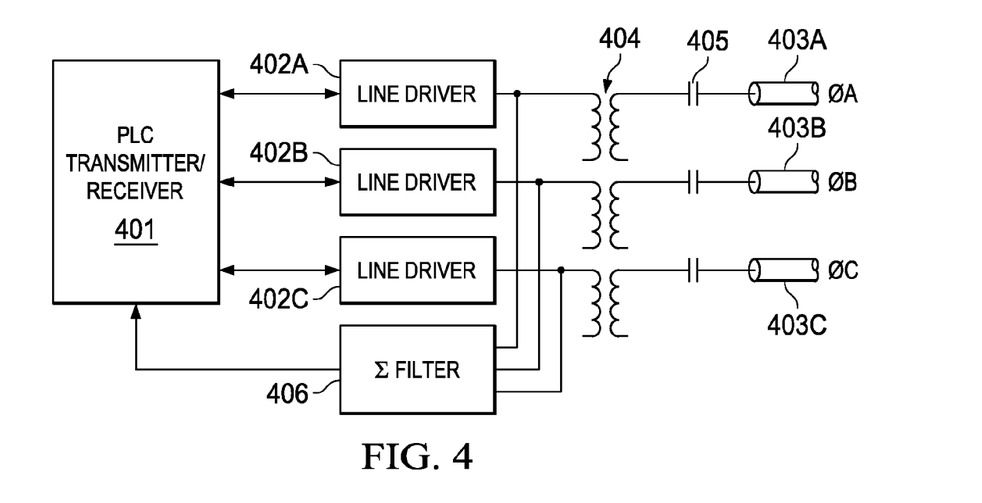
FIGS. 4-6 are block diagrams illustrating connections between a PLC transmitter and/or receiver circuitry to three-phase power lines according to some embodiments.

In various implementations, PLC device or modem 113 may include transmitter and/or receiver circuits configured to connect to power lines 103, 105, and/or 108. FIG. 4 illustrates a connection between the power line communication transmitter and/or receiver circuitry to the power lines according to some embodiments. PLC transmitter/receiver 401 may function as the transmitter and/or receiver circuit. When PLC transmitter/receiver 401 operates as a transmitter, it may generate pre-coded signals for transmission over the power line network. Each output signal, which may be a digital signal, may be provided to a separate line driver circuit 402A-C. Line drivers 402A-C may comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line. Conversely, when PLC transmitter/receiver 401 operates as a receiver, coded signals may be received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

Figure 5:
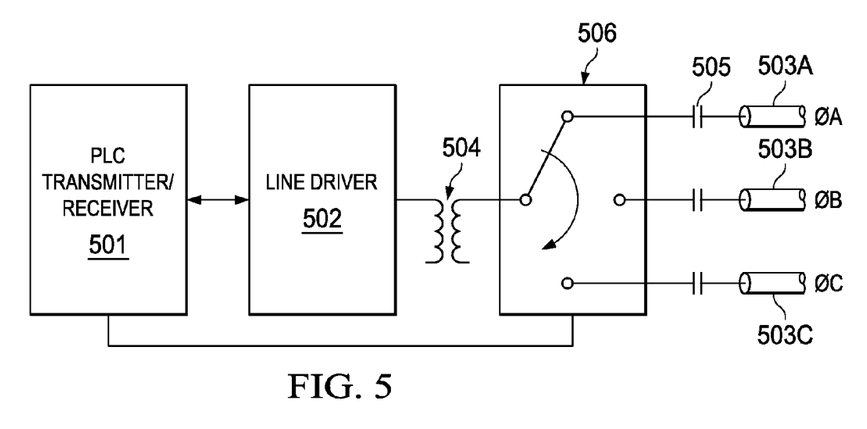

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

Figure 6:
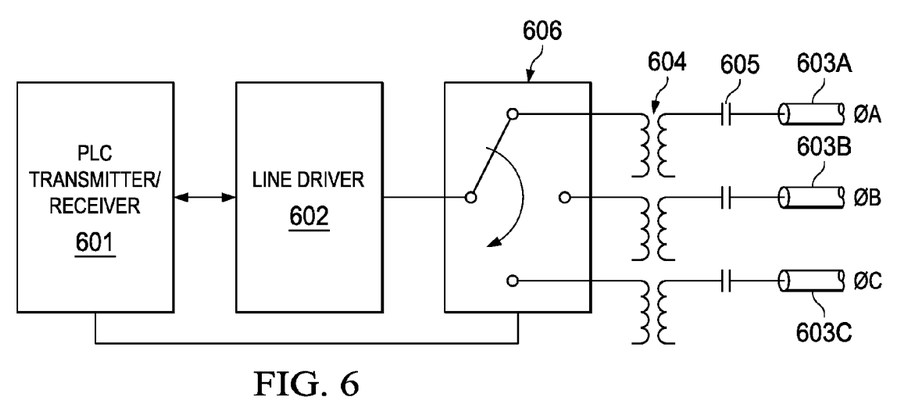

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

Figure 7:
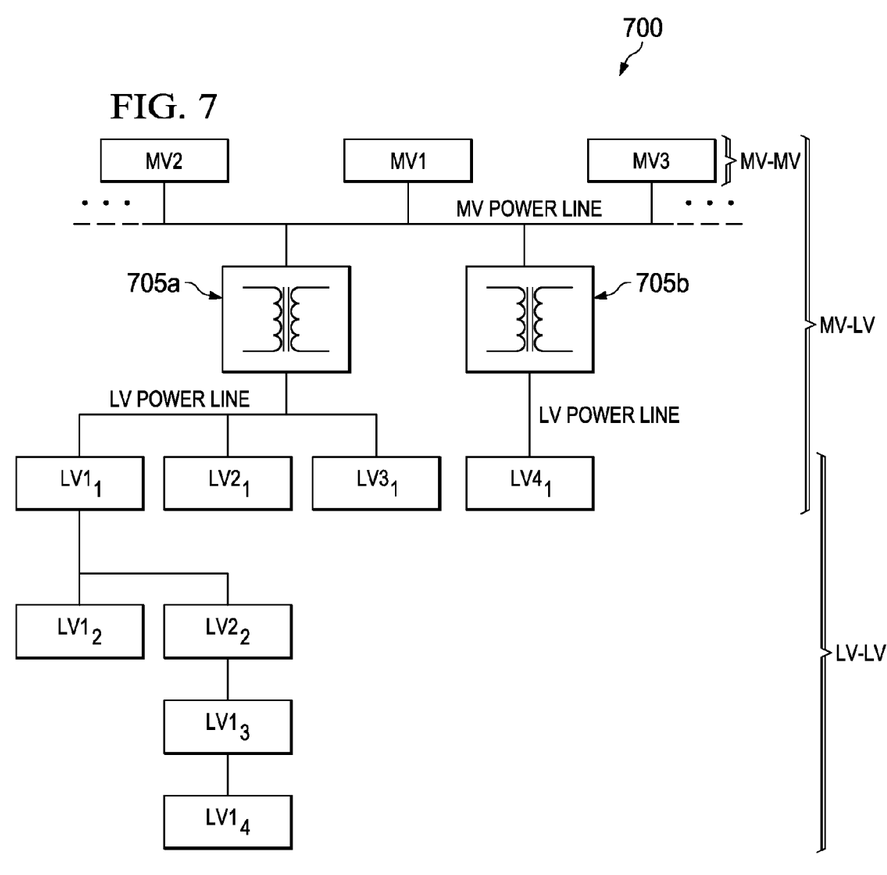
FIG. 7 is a block diagram of a hierarchical PLC communications network according to some embodiments.

Turning to FIG. 7 a block diagram of a hierarchical PLC communications network 700 is depicted. In the embodiment shown, medium-voltage (MV) devices or modems MV1, MV2, and MV3 (e.g., PLC data concentrators, routers, etc.) are coupled to an MV power line (e.g., 103 in FIG. 1). First-level low-voltage (LV) devices $LV1_1$, $LV2_1$, $LV3_1$, and $LV4_1$ (e.g., a PLC charger, a PLC meter, a PLC modem, etc.) are coupled to an LV power line (e.g., 105 in FIG. 1) through transformers 705a and 705b (e.g., 104 in FIG. 1). Second-level LV devices $LV1_2$ and $LV2_2$ are coupled to device $LV1_1$. Third-level device $LV1_3$ is coupled to device $LV2_2$, and fourth-level device $LV1_4$ is coupled to device $LV1_3$ (second-, third-, and fourth-level devices may be referred to as "lower-level" devices). It should be noted that network 700 is presented for sake of illustration only, and that in any given implementation may include an arbitrary number of MV and/or LV devices coupled in different ways under a different hierarchy. As illustrated, at least three different types of communication take place in network 700; namely, between MV devices (the "MV-MV network"), between MV devices and first-level LV devices (the "MV-LV network"), and among LV devices (the "LV-LV network").

Within network 700, communications may be achieved between or among devices using one or more different frequency subbands (also referred to as "tone masks" or "channels") in the downlink and uplink directions. Generally speaking, the term "downlink" refers to a communication in a direction that is received by a given device, and the term "uplink" refers to a communication in a direction that is transmitted by that same device. In the case of MV-LV communications, however, the term "downlink" refers to links or communications taking place from an MV device to an LV device, and the term "uplink" refers to links or communications taking place from an LV device to an MV device.

In a typical case, the frequency subband over which an MV device can communicate with an LV device (downlink) may be different from the subband that the LV device may used to communicate with an MV device (uplink). Also, the uplink and downlink subbands may be different between different LV devices communicating with the same MV device. As such, each PLC device involved in a communication may select (or allow another device to select) good or best communication channels or subbands, for example, based upon a determination of channel conditions (e.g., signal-to-noise ratio (SNR) measurements, congestion indicators, etc.) or the like.

In some embodiments, the PLC devices described above (and/or the computer system shown in FIG. 12) may be configured to implement one or more communication techniques through modifications to the network's MAC protocol. Generally speaking, a MAC protocol is a sub-layer of a data link layer specified in a seven-layer Open Systems Interconnection (OSI) model. Particularly, a MAC protocol may provide addressing and channel access control mechanisms that enable terminals or network nodes (e.g., PLC modems, etc.) to communicate over a shared medium (i.e., a power line). To facilitate communications among the devices described above, each device may implement a MAC protocol configured to coordinate inter-device communications according to one or more "superframe" structures. Such superframes may define the duration and/or relative times for transmission and/or receipt of different types of information by each device.

Figure 8:
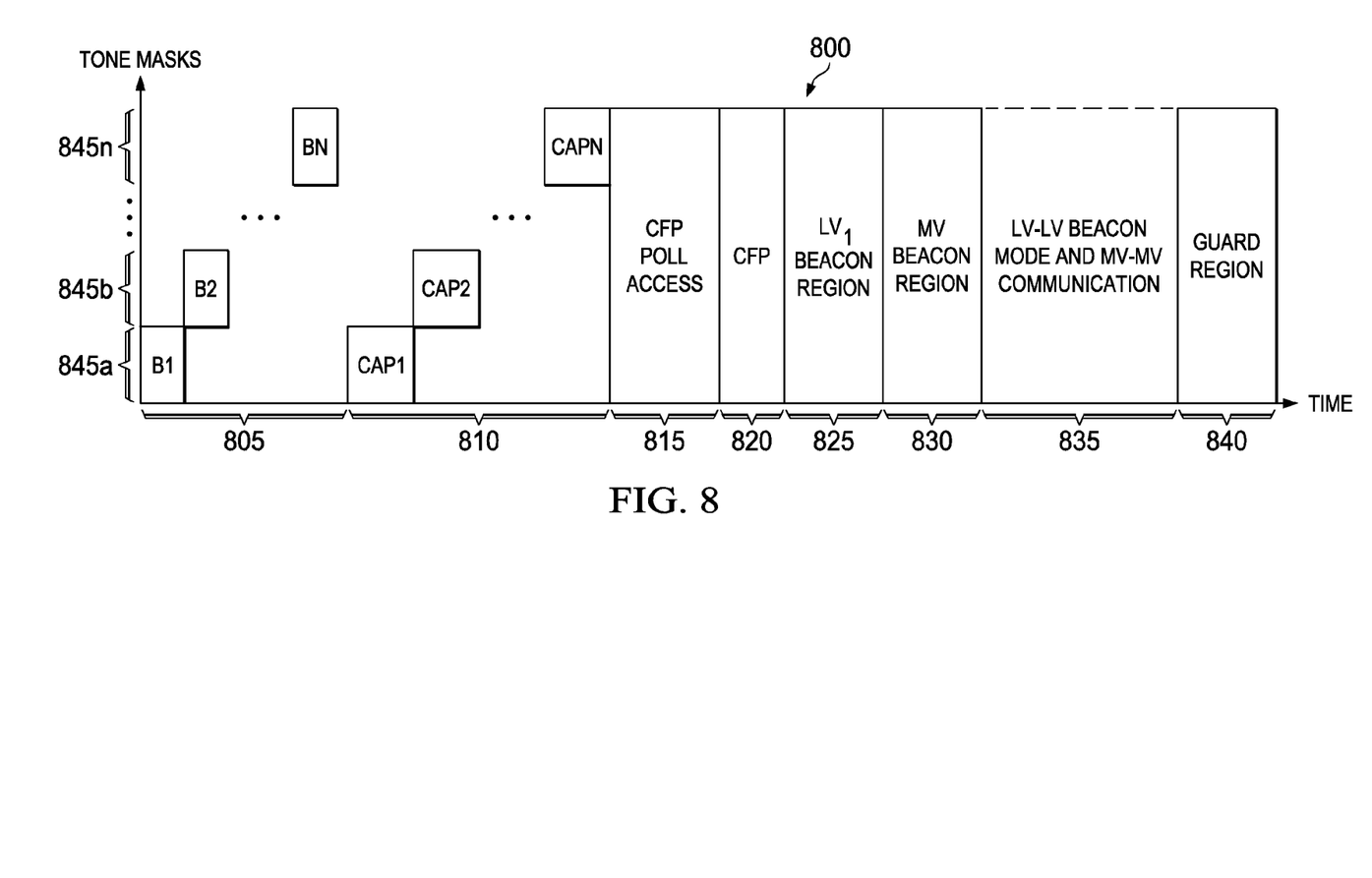
FIG. 8 is a block diagram of a MAC superframe suitable for PLC communications according to some embodiments.

FIG. 8 is a block diagram of a MAC superframe suitable for PLC communications according to some embodiments. As illustrated, superframe 800 includes beacon slots 805 (e.g., $B_1$, $B_2$, ..., $B_N$), followed by Contention Access Period (CAP) slots 810 (e.g., $CAP_1$, $CAP_2$, ..., $CAP_N$), which are in turn followed by Contention Free Period (CFP) poll access slot 815, CFP slot 820, $LV_1$ beacon region 825, MV beacon region 830, LV-LV beacon mode and MV-MV communication slot 835, and guard region 840.

In various embodiments, superframe 800 may be particularly well suited for use by MV devices (e.g., MV1, MV2, or MV3) shown in FIG. 7. In such cases, during beacon slots 805, an MV device may transmit one or more beacon packets (e.g., over slots $B_1, B_2, \ldots, B_N$) to one other MV devices and/or to one or more first-level LV devices $LV1_1$, $LV2_1$, $LV3_1$, and/or $LV4_1$ (i.e., in a downlink direction). Moreover, each beacon packet may include information that identifies the particular beacon slot over which it was sent and/or it may indicate the length, position, and/or duration of one or more (e.g., all) other elements in superframe 800 (e.g., other beacon slots 805, CAP slots 810, etc.). Accordingly, once a listening first-level LV device receives a given beacon packet, for example, the structure and/or timing of superframe 800 may be readily acquired or derived by that device.

During CAP slots 810, superframe 800 may allow one or more of first-level LV devices $LV1_1$, $LV2_1$, $LV3_1$, and/or $LV4_1$ to transmit packets to an MV device (i.e., in the uplink direction), subject to contention or competition for the medium (e.g., using a carrier sense multiple access (CSMA) technique, carrier access (CA) technique, or the like). As illustrated, beacon slots 805 and CAP slots 810 in superframe 800 may be divided into "tone masks" or "frequency subbands" 845a-n. Specifically, $B_1$ and $CAP_1$ occupy frequency subband 845a, $B_2$ and $CAP_2$ occupy frequency subband 845b, and $B_N$ and $CAP_N$ occupy frequency subband 845n. Hence, in this case, each of beacon slots 805 and CAP slots 810 follow a same sequence of frequency subbands. In other cases, however, beacon slots 805 and CAP slots 810 may follow different sequences of frequency subbands.

Although subsequent slots 815-840 are illustrated spanning all subbands 845a-n at the same time, it should be noted that CFP Poll Access slot 815 as well as CFP slot 820 do not necessarily occupy the full-band, but may instead actually use only the a selected downlink and uplink subband(s) for a given node. It should also be noted that any given implementation may include any arbitrary number of two or more frequency subbands. Also, in some implementations, each of tone masks 845a-n may have an equal, predetermined spectral width. Additionally or alternatively, tone masks 845a-n may have different spectral widths. Similarly, each of CAP slots 810 may have an equal, predetermined duration or length. Additionally or alternatively, CAP slots 810 may have varying durations or lengths.

If multiple MV devices used the same CFP slot 820 at the same time, then poll and/or data packets would potentially collide. Hence, during CFP poll access slot 815, two or more MV devices (e.g., MV1 and MV2) may compete for access to use the immediately following CFP slot 820. For example, during CFP poll access slot 815, any given MV device may employ CSMA/CA in full band (i.e., a combination of frequency subbands 845a-n) to broadcast a "Poll Reserve Packet" to other MV devices. In some cases, if any MV device gets access to the channel and manages to transmit its Poll Reserve Packet, then that MV device is granted use CFP slot 820. Conversely, if an MV device receives a Poll Reserve Packet from one or more other MV devices (e.g., before it has a change to transmit its own Poll Reserve Packet), then the MV device remains silent during CFP slot 820. During CFP 820, an MV device (e.g., the MV device that gains access to CFP slot 820 for its own use) may employ a poll-based mechanism for uplink and/or downlink communications (e.g., on-demand) with first-level PLC devices $LV1_1$, $LV2_1$, $LV3_1$, and/or $LV4_1$ without contention and/or risk of collision.

During $LV_1$ beacon region 825, first-level LV devices $LV1_1$, $LV2_1$, $LV3_1$, and/or $LV4_1$ may employ a CSMA/CA technique to transmit their own beacons to lower-level devices. For example, those beacons may indicate that the lower-level devices are allowed to communicate with each other and/or with the first-level LV device during LV-LV beacon mode and MV-MV communication slot 835. During $LV_1$ beacon region 825, MV devices may remain silent or otherwise abstain from transmitting messages (i.e., they may be said to be "inactive"). Similarly, during MV beacon region 830, each MV device may employ CSMA/CA to transmit beacons to other MV devices indicating that those MV devices are allowed to communicate with each other during LV-LV beacon mode and MV-MV communication slot 835. During MV beacon region 830, first-level LV devices may remain silent or otherwise abstain from transmitting messages (i.e., they may be said to be "inactive"). Finally, during LV-LV beacon mode and MV-MV communication slot 835, MV devices may be allowed to communicate with other MV devices, and LV devices may be allowed to communicate with other LV devices, but there may be no MV-LV communications. Guard region 840 may then be used to separate subsequent superframes in time.

Figure 9:
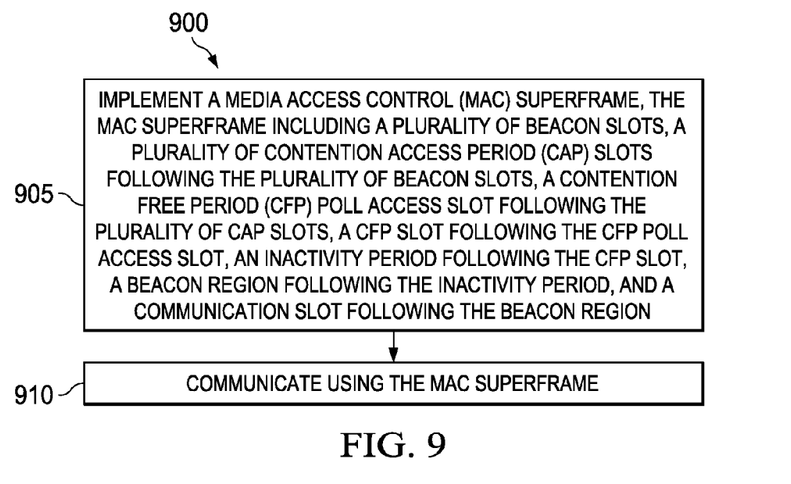
FIG. 9 is a flowchart of a method of operating MV devices using MAC superframes according to some embodiments.

FIG. 9 is a flowchart of a method of operating MV devices using MAC superframes. In some embodiments, method 900 may be executed, at least in part, by an MV device (e.g., MV1, MV2, and/or MV3 in FIG. 7). At block 905, method 900 may include implementing superframe 800, the MAC superframe including a plurality of beacon slots 805, a plurality of CAP slots 810 following the plurality of beacon slots 805, a CFP poll access slot 815 following the plurality of CAP slots 810, a CFP slot 820 following the CFP poll access slot 815, an inactivity period (e.g., $LV_1$ beacon region 825) following the CFP slot 820, a beacon region (e.g., MV beacon region 830) following the inactivity period, and a communication slot (e.g., LV-LV beacon mode and MV-MV communication slot 835) following the beacon region. At block 910, method 900 may include communicating with another communication device (e.g., another MV device, and LV device, etc.) using superframe 800.

It may be determined from the description of FIGS. 8 and 9, that when two or more MV devices use a similar superframe structure, "hidden node" collisions may occur at those MV devices due to transmissions from other MV devices and/or LV devices over the same tone mask. For example, first-level LV devices $LV1_1$, $LV2_1$, $LV3_1$, and/or $LV4_1$ intending to contend in a given channel may choose one of CAP slots 810 in which to transmit a packet to MV1, MV2, and/or MV4. Collision may happen, for example, if two different nodes select the same one of CAP slots 810. Specifically, one of first-level LV devices $LV1_1$, $LV2_1$, or $LV3_1$ may not be able to sense (e.g., via CSMA/CA or the like) an ongoing transmission by another first-level LV device $LV4_1$ because such a transmission is attenuated in the LV power line due to transformers 705a-b. If a first-level LV device (e.g., $LV_1$) cannot sense $LV4_1$'s ongoing transmission and thus decides to initiate their own transmission, the two concurrent transmissions from the different sources $LV1_1$ and $LV4_1$ may collide in MV power line, and MV devices would not be able to receive either communication.

In some embodiments, in order to minimize or otherwise reduce hidden node collisions, the sequence of frequency subbands followed by beacon slots 805 and CAP slots 810 may be randomly selected by each MV device and without coordination among those devices. By using such randomized tone mask patterns, each MV device is likely to operate in different tone masks at any given time (although it is not guaranteed that every different MV device will operate in a different tone mask at all times).

Additionally or alternatively, in order to minimize or otherwise reduce hidden node collisions, superframes across different MV devices may be synchronized by allowing a selected one of the MV device to act as a Personal Area Network (PAN) coordinator and determine the superframe structures of other MV devices. For example, the start of beacon period 805, the start of CFP poll access slot 815, and the end of CFP slot 820 may be synchronized across multiple MV devices under control of the PAN coordinator. In some embodiments, only the start and end of an entire CAP period 810 may be synchronized between multiple MV devices (and each MV device may allocate CAP time for individual frequency subbands independently). Alternatively, the start and end of each time slot within CAP slots 810 may be synchronized across multiple MV nodes (i.e., the PAN coordinator may specify the CAP start and end times for each CAP slot).

Figure 10:
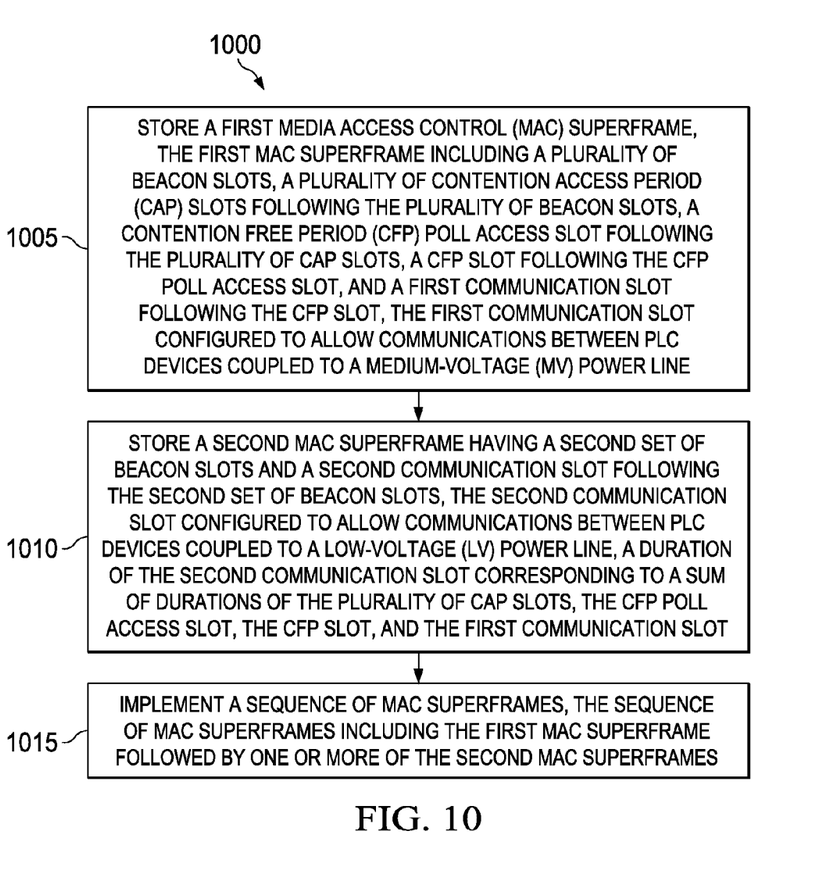
FIG. 10 is a flowchart of a method of implementing MAC superframe coordination across two or more MV devices using time-division multiplexing according to some embodiments.

Additionally or alternatively, in order to minimize or otherwise reduce hidden node collisions, a time-division multiplexing approach may be adopted. FIG. 10 is a flowchart of a method of implementing MAC superframe coordination across two or more MV devices using time-division multiplexing. In some implementations, method 1000 may be executed, at least in part, by an MV device (e.g., MV1, MV2, and/or MV3 in FIG. 7). At block 1005, method 1000 may include storing a first MAC superframe (e.g., an "MV-LV/MV-MV superframe"), the first MAC superframe including a plurality of beacon slots 805, a plurality of CAP slots 810 following the plurality of beacon slots 805, a CFP poll access slot 815 following the plurality of CAP slots 810, and a CFP slot 820 following the CFP poll access slot 815. The first MAC superframe may also include a first communication slot configured to allow communications between PLC devices coupled to an MV power line.

At block 1010, method 1000 may include storing a second MAC superframe (e.g., an "LV-LV superframe") having a second set of beacon slots and a second communication slot following the second set of beacon slots. The second communication slot may be configured to allow communications between PLC devices coupled to an LV power line (e.g., in beacon mode). In some implementations, the duration of the second communication slot may correspond (or be equal to) to a sum of durations of the plurality of CAP slots 810, the CFP poll access slot 815, the CFP slot 820, and the first communication slot. At block 1015, method 1000 may include implementing a sequence of MAC superframes, the sequence of MAC superframes including the first MAC superframe followed by one or more of the second MAC superframes.

Figure 11A:
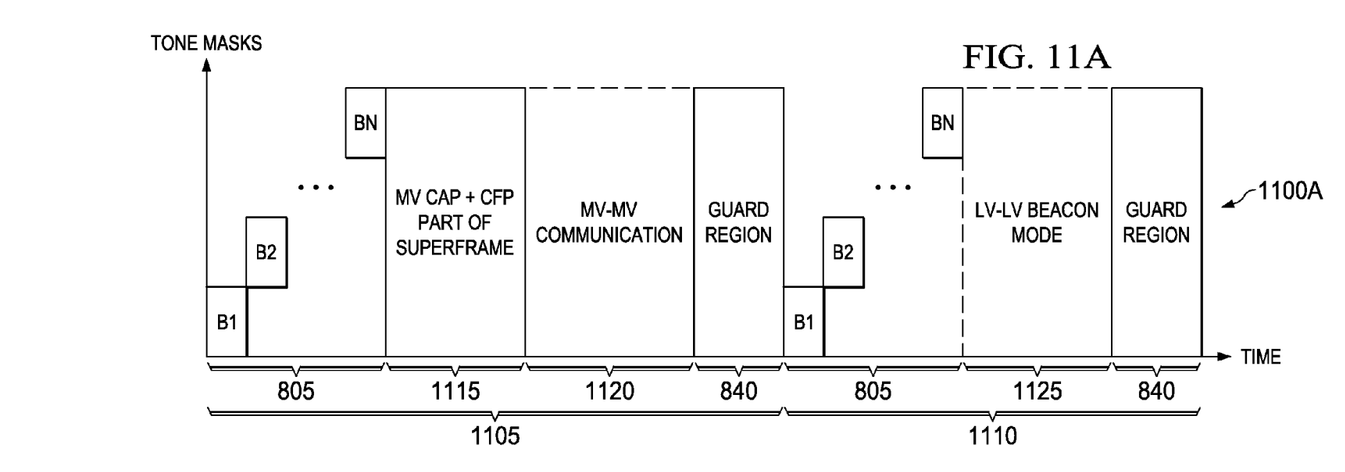
FIGS. 11A and 11B are diagrams illustrating an implementation of MAC superframe coordination across two or more MV devices using time-division multiplexing according to some embodiments.
Figure 11B:
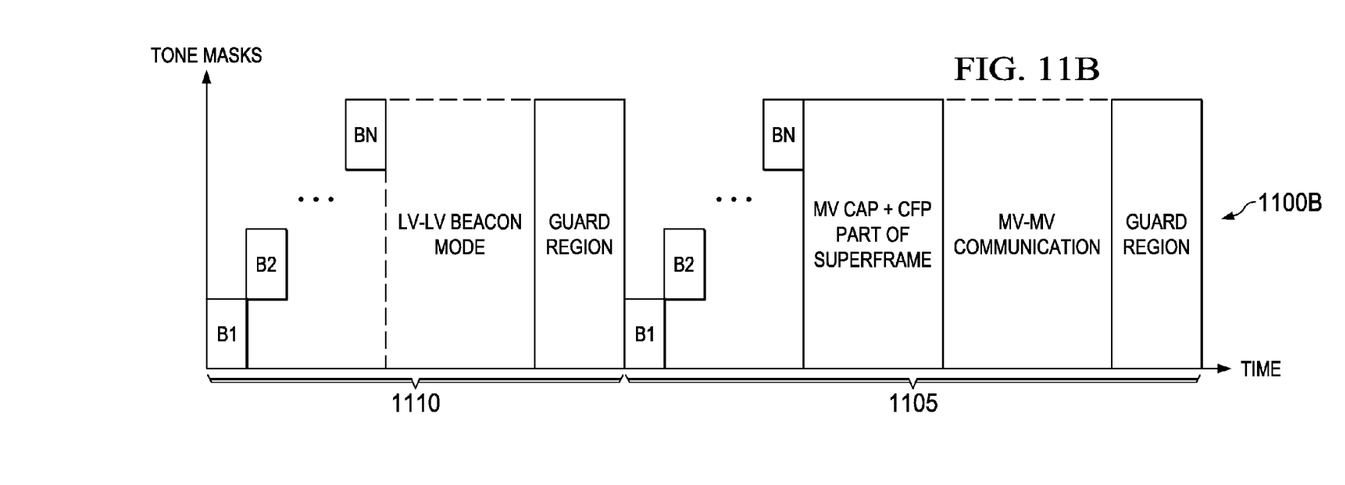

To help illustrate an implementation of MAC superframe coordination across two or more MV devices using time-division multiplexing as described in connection with FIG. 10 above, FIGS. 11A and 11B are provided. As shown, sequence 1100A of superframes includes MV-LV/MV-MV superframe 1105 followed by LV-LV superframe 1110, whereas sequence 1100B of superframes includes LV-LV superframe 1110 followed by MV-LV/MV-MV superframe 1105. In some embodiments, a first MV device (e.g., MV1) may implement sequence 1105, and a second MV device (e.g., MV2) may implement sequence 1110. Region 1115 of MV-LV/MV-MV superframe 1105 may include, for example, a plurality of CAP slots 810 following the plurality of beacon slots 805, a CFP poll access slot 815 following the plurality of CAP slots 810, and a CFP slot 820 following the CFP poll access slot 815, as previously shown in FIG. 8 (i.e., CAP slots 810 are present across each individual subband but are shown as one "wideband" block in FIG. 11 for simplicity of illustration only). As such, region 1115 may be configured to allow MV-LV communications. The first MAC superframe may also include first communication slot 1120 following region 1115, which may be configured to allow communications between or among MV devices (i.e., MV-MV communications).

Meanwhile, LV-LV superframe 1110 may include second communication slot 1125 configured to allow communications between PLC devices coupled to an LV power line (i.e., LV-LV communications only). In some embodiments, second communication slot 1125 may have its duration corresponding and/or equal to a sum of durations of region 1115 (i.e., plurality of CAP slots 810, the CFP poll access slot 815, and the CFP slot 820) with first communication slot 1120.

In various implementations, only one MV device in set of neighboring MV devices may operate in MV-LV mode (i.e., during region 1115) at a given time. That is, when MV1 is implementing MV-LV/MV-MV superframe 1105, MV2 is implementing LV-LV superframe 1110 and vice versa. Thus, while MV1 is operating with its MV-LV/MV-MV superframe, MV2 (and other neighboring MV devices) may remain silent and allow LV-LV communications to take place without interference.

To synchronize sequences 1105 and 1110 between MV1 and MV2 (or any other number of MV devices), one of the MV devices may be designated as a PAN coordinator and may provide a sequence to each respective MV device. Additionally or alternatively, the MV devices may use CSMA/CA or the like to content amongst each other and to send a "Superframe Reserve Frame" or packet to other MV devices, for example, during guard region 840. In some cases, if an MV device wins the channel and sends the Superframe Reserve Frame during guard region 840, it may then implement its subsequent superframe as an MV-LV/MV-MV superframe 1105, and therefore it may be able to conduct MV-LV communications (i.e., during region 1115) as well as MV-MV communications (i.e., during period 1120). Accordingly, other MV nodes that hear this frame may operate with an LV-LV superframe 1110, and may transmit a beacon to permit LV-LV communications (i.e., during second communication period 1125).

Although FIGS. 11A and 11B show sequences of MV-LV/MV-MV and LV-LV superframes for two MV devices, it should be understood that these techniques may be employed for any suitable number of MV devices. For example, as between three neighboring devices, each may us a sequence of superframes such that only once MV device employs an MV-LV/MV-MV superframe at any given time, as shown in Table I below:

TABLE I

| | First Superframe | Second Superframe | Third Superframe |
|---|---|---|---|
| MV1's Sequence | MV-LV/MV-MV | LV-LV | LV-LV |
| MV2's Sequence | LV-LV | MV-LV/MV-MV | LV-LV |
| MV3's Sequence | LV-LV | LV-LV | MV-LV/MV-MV |

It should be noted that networks with three or more MV devices tend to favor LV-LV communications (i.e., any given MV device is more likely to be implementing an LV-LV superframe than an MV-LV/LV-LV superframe at any given time), whereas networks with only two MV devices are more evenly divided between MV-LV, MV-MV, and LV-LV communications.

In some embodiments, in order to further minimize or otherwise reduce hidden node collisions, a Guaranteed Time Slot (GTS) may be used in lieu of CFP poll access. Particularly, referring back to FIG. 8, CFP poll access slot 815 may be removed from superframe 800 (and also from region 1115 of superframe 1105 in FIG. 11), and instead CFP slot 820 may be split into uplink and downlink time slots. The CFP uplink and downlink time slots may be synchronized between MV routers such that they may perform uplink and downlink operations at the same time. This may prevent hidden node collisions, insofar as such collisions tend to occur due to simultaneous transmission of a downlink and uplink messages at neighboring MV devices. It should be noted, however, that acknowledgment packets in the uplink direction may only be received during the CFP uplink time slots, which may in turn cause a delayed acknowledgement or increased latency (e.g., if the acknowledgement packet is transmitted in a subsequent superframe).

Moreover, as noted above, in some cases the sequence of frequency subbands followed by beacon slots 805 and CAP slots 810 may be randomly selected by each MV device. As such, in some implementations, CFP poll access slot 815 and CFP slot 820 may be absent from superframe 800 (and also from region 1115 of superframe 1105 in FIG. 11). Also, CAP and beacon slots for each frequency subband may be synchronized and orthogonal to other neighboring MV devices.

As previously noted, different embodiments of MV-MV coordination are described. For example, an embodiment employs a Time-Division Multiple Access (TDMA) approach, which have a simpler superframe structure, but may involve only an MV router performing MV-LV and MV-MV communication within a superframe, while ensuring that there is no LV-LV communication for that router (other routers can do LV-LV communication). This embodiment is described, for example, in connection with FIGS. 10 and 11. Another alternative embodiment described above may allow for more fields within the super-frame structure as well as enable MV-MV communication, MV-LV communication, and LV-LV communication all to occur within a single superframe.

Figure 12:
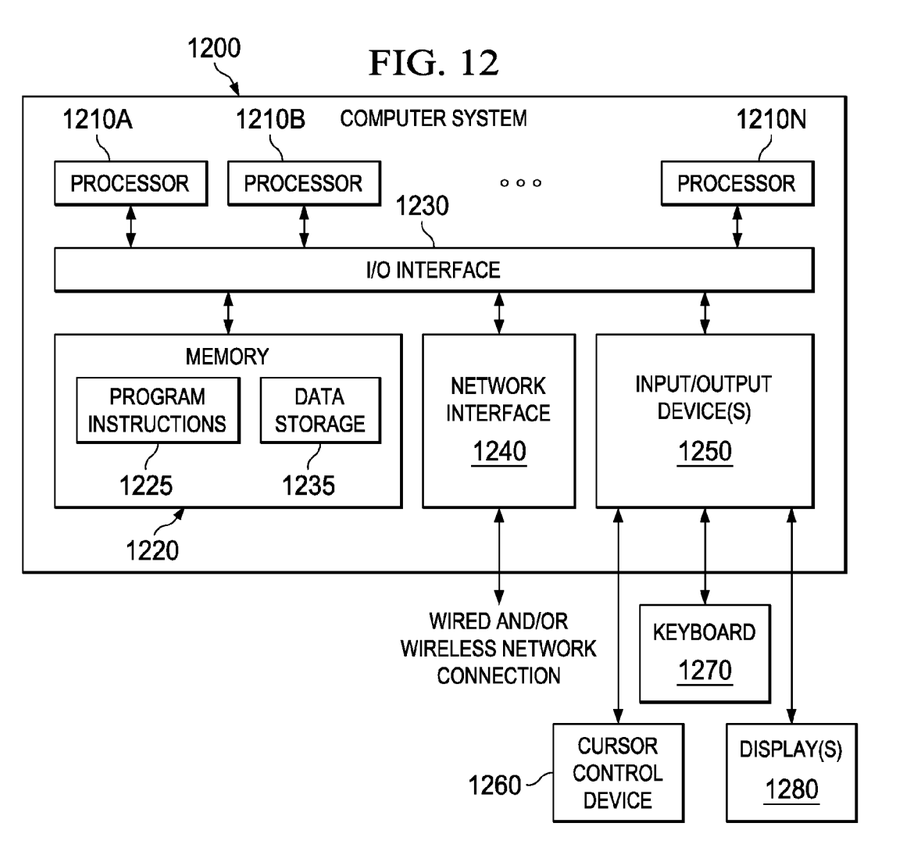
FIG. 12 is a block diagram of a computing system configured to implement certain systems and methods described herein according to some embodiments.

In certain embodiments, systems and methods for designing, using, and/or implementing superframe coordination in beacon-enabled networks may be executed, at least in part, by one or more communication devices and/or computer systems. One such computer system is illustrated in FIG. 12. In various embodiments, system 1200 may be implemented as a communication device, modem, data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 1200 includes one or more processors 1210 coupled to a system memory 1220 via an input/output (I/O) interface 1230. Computer system 1200 further includes a network interface 1240 coupled to I/O interface 1230, and one or more input/output devices 1225, such as cursor control device 1260, keyboard 1270, display(s) 1280, and/or mobile device 1290. In various embodiments, computer system 1200 may be a single-processor system including one processor 1210, or a multi-processor system including two or more processors 1210 (e.g., two, four, eight, or another suitable number). Processors 1210 may be any processor capable of executing program instructions. For example, in various embodiments, processors 1210 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1210 may commonly, but not necessarily, implement the same ISA. Also, in some embodiments, at least one processor 1210 may be a graphics processing unit (GPU) or other dedicated graphics-rendering device.

System memory 1220 may be configured to store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include any tangible storage media or memory media such as magnetic or optical media—e.g., disk or CD/DVD-ROM coupled to computer system 1200 via I/O interface 1230. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, mobile devices, or any other devices suitable for entering or retrieving data by one or more computer system 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement certain embodiments described herein, and data storage 1235, comprising various data accessible by program instructions 1225. In an embodiment, program instructions 1225 may include software elements of embodiments illustrated in the above figures. For example, program instructions 1225 may be implemented in various embodiments using any desired programming language, scripting language, or combination of programming languages and/or scripting languages (e.g., C, C++, C#, JAVA®, JAVASCRIPT®, PERL®, etc.). Data storage 1235 may include data that may be used in these embodiments (e.g., recorded communications, profiles for different modes of operations, etc.). In other embodiments, other or different software elements and data may be included.

A person of ordinary skill in the art will appreciate that computer system 1200 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
    performing, using a Power Line Communication (PLC) data concentrator coupled to a medium-voltage (MV) power line,
        implementing a Media Access Control (MAC) superframe, the MAC superframe including a plurality of beacon slots, a plurality of Contention Access Period (CAP) slots following the plurality of beacon slots, a Contention Free Period (CFP) poll access slot following the plurality of CAP slots, a CFP slot following the CFP poll access slot, an inactivity period following the CFP slot, a beacon region following the inactivity period, and a communication slot following the beacon region, wherein the PLC data concentrator communicates with a PLC device during at least a portion of at least one of the plurality of beacon slots and during at least a portion of at least one of the plurality of CAP slots, the PLC device coupled to a low-voltage (LV) power line, the LV power line coupled to the MV power line through a transformer, and wherein the PLC data concentrator refrains from transmitting messages during at least a portion of the inactivity period to allow communications between the PLC device and another PLC device, the other PLC device coupled to the LV power line; and
    communicating with another PLC data concentrator coupled to the MV power line, wherein the communication between the PLC data concentrator and the other PLC data concentrator is configured to place during at least a portion of the communication slot using the MAC superframe.

2. The method of claim 1, wherein each of the plurality of beacon slots occurs over a respective subband of a sequence of frequency subbands, and wherein each of the plurality of CAP slots occurs over a respective subband of the sequence of frequency subbands.

3. The method of claim 2, wherein the sequence of frequency subbands is randomly selected.

4. The method of claim 2, wherein the PLC data concentrator is further configured to compete with the other PLC data concentrator, during at least a portion of the CFP poll access slot over one of the sequence subbands, for use of the CFP slot.

5. The method of claim 1, wherein the PLC data concentrator is further configured to compete with the other PLC data concentrator, during at least a portion of the beacon region, for use of a plurality of beacon slots and a plurality of CAP slots in a subsequent MAC superframe.

6. The method of claim 1, wherein the PLC data concentrator is configured to not communicate with the PLC devices during at least a portion of the communication slot, and wherein the PLC devices are configured to communicate with each other during at least a portion of the communication slot.

7. A system, comprising:
- a Power Line Communication (PLC) data concentrator coupled to a medium-voltage (MV) power line, the MV power line coupled to a low-voltage (LV) power line through a transformer, the PLC data concentrator comprising:
    - a processor; and
    - a memory coupled to the processor, the memory configured to store program instructions executable by the processor to cause the PLC data concentrator to:
        - implement a Media Access Control (MAC) superframe, the MAC superframe including a plurality of beacon slots, a plurality of Contention Access Period (CAP) slots following the plurality of beacon slots, and a Contention Free Period (CFP) poll access slot following the plurality of CAP slots, a CFP slot following the CFP poll access slot, an inactivity period following the CFP slot, a beacon region following the inactivity period, and a communication slot following the beacon region, wherein the PLC data concentrator communicates with a PLC device during at least a portion of at least one of the plurality of beacon slots and during at least a portion of at least one of the plurality of CAP slots, the PLC device coupled to a low-voltage (LV) power line, the LV power line coupled to the MV power line through a transformer, and wherein the PLC data concentrator refrains from transmitting messages during at least a portion of the inactivity period to allow communications between the PLC device and another PLC device, the other PLC device coupled to the LV power line; and
        - communicate with another PLC data concentrator coupled to the MV power line, wherein the communication between the PLC data concentrator and the other PLC data concentrator is configured to place during at least a portion of the communication slot using the MAC superframe.

8. The system of claim 7, wherein the processor includes a digital signal processor (DSP), an application specific integrated circuit (ASIC), a system-on-chip (SoC) circuit, a field-programmable gate array (FPGA), a microprocessor, or a microcontroller.

9. The system of claim 7, wherein the other PLC data concentrator is configured to implement another MAC superframe.

10. The system of claim 9, wherein the plurality of beacon and CAP slots of the MAC superframe follows a different sequence of frequency subbands than a plurality of beacon and CAP slots of the other MAC superframe.

11. The system of claim 10, wherein the plurality of CAP slots of the MAC superframe has a synchronized start time and a synchronized end time with respect to the plurality of CAP slots of the other MAC superframe.

12. The system of claim 10, wherein each of the plurality of CAP slots of the MAC superframe has a synchronized start time and a synchronized end time with respect to a corresponding one of the plurality of CAP slots of the other MAC superframe.

13. The system of claim 9, wherein the CFP slot of the MAC superframe includes a downlink slot and an uplink slot, and wherein the downlink and uplink slots are synchronized with respect to downlink and uplink slots within a CFP slot of the other MAC superframe.

14. A non-transitory electronic storage medium having program instructions stored thereon that, upon execution by a processor within a Power Line Communication (PLC) device, cause the PLC device to:
- store a first Media Access Control (MAC) superframe, the first MAC superframe including a plurality of beacon slots, a plurality of Contention Access Period (CAP) slots following the plurality of beacon slots, a Contention Free Period (CFP) poll access slot following the plurality of CAP slots, a CFP slot following the CFP poll access slot, and a first communication slot following the CFP slot, the first communication slot configured to allow communications between PLC devices coupled to a medium-voltage (MV) power line, a guard region following the communication slot;
- store a second MAC superframe having a second set of beacon slots, a guard region and a second communication slot following the second set of beacon slots, the second communication slot configured to allow communications between PLC devices coupled to a low-voltage (LV) power line, a duration of the second communication slot corresponding to a sum of durations of the plurality of CAP slots, the CFP poll access slot, the CFP slot, and the first communication slot;
- implement a sequence of MAC superframes, the sequence of MAC superframes including the first MAC superframe followed by one or more of the second MAC superframes; and
- contend with another PLC device, during at least a portion of the guard regions, for implementation of a subsequent first MAC superframe.

15. The electronic storage medium of claim 14, wherein the sequence of MAC superframes is defined by a Personal Area Network (PAN) coordinator, and wherein a number of the one or more of the second MAC superframes corresponds to a number of other PLC devices neighboring the PLC device.

* * * * *